(12) United States Patent
Epstein et al.

(10) Patent No.: US 6,592,234 B2
(45) Date of Patent: Jul. 15, 2003

(54) FRONTLIT DISPLAY

(75) Inventors: Kenneth A. Epstein, St. Paul, MN (US); Robert P. Wenz, Woodbury, MN (US); Gary T. Boyd, Woodbury, MN (US); Stephan J. Pankratz, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 10 days.

(21) Appl. No.: 09/844,744

(22) Filed: Apr. 6, 2001

(65) Prior Publication Data

US 2002/0149925 A1 Oct. 17, 2002

(51) Int. Cl.$^7$ .................................. F21V 7/04
(52) U.S. Cl. .................. 362/31; 362/362; 362/561; 362/26; 349/63
(58) Field of Search .............. 362/31, 26, 559, 362/561, 339; 349/63, 64, 65, 66, 67, 68

(56) References Cited

U.S. PATENT DOCUMENTS

| | | | |
|---|---|---|---|
| 4,373,282 A | 2/1983 | Wragg | 40/546 |
| 4,528,617 A | 7/1985 | Blackington | 362/558 |
| 4,751,615 A | 6/1988 | Abrams | 362/31 |
| 4,799,137 A | 1/1989 | Aho | 362/309 |
| 4,811,507 A | 3/1989 | Blanchet | 40/546 |
| 4,874,228 A | 10/1989 | Aho et al. | 349/62 |
| 5,005,108 A | 4/1991 | Pristash et al. | 362/31 |
| 5,050,946 A | 9/1991 | Hathaway et al. | 385/33 |
| 5,054,885 A | 10/1991 | Melby | 359/618 |
| 5,190,370 A | 3/1993 | Miller et al. | 362/340 |
| 5,341,231 A | 8/1994 | Yamamoto et al. | 349/63 |
| 5,359,691 A | 10/1994 | Tai et al. | 385/146 |
| 5,396,350 A | 3/1995 | Beeson et al. | 349/62 |
| 5,428,468 A | 6/1995 | Zimmerman et al. | 349/62 |
| 5,485,354 A | 1/1996 | Ciupke et al. | 349/62 |
| 5,506,929 A | 4/1996 | Tai et al. | 385/31 |
| 5,545,280 A | 8/1996 | Wenz | 385/146 |
| 5,555,109 A | 9/1996 | Zimmerman et al. | 156/234 |
| 5,555,329 A | 9/1996 | Kuper et al. | 349/57 |
| 5,575,549 A | 11/1996 | Ishikawa et al. | 385/36 |

(List continued on next page.)

FOREIGN PATENT DOCUMENTS

| | | |
|---|---|---|
| EP | 0 802 446 A1 | 10/1997 |
| EP | 0 879 991 A2 | 11/1998 |
| EP | 1 081 633 A2 | 7/2001 |
| GB | 2 331 615 A | 5/1999 |
| JP | 61-188515 A | 8/1986 |
| JP | 11-65764 | 3/1999 |
| JP | 11-110131 | 4/1999 |
| JP | 11-174972 | 7/1999 |
| JP | 11-260133 | 9/1999 |
| JP | 11-316553 | 11/1999 |
| JP | 2000-47178 | 2/2000 |
| JP | 2000-75293 | 3/2000 |
| JP | 2000187197 | 7/2000 |
| JP | 2001051256 | 2/2001 |
| JP | 2001100186 | 4/2001 |
| WO | WO 99/53431 | 10/1999 |
| WO | WO 99/63394 | 12/1999 |
| WO | WO 00/75720 | 12/2000 |

*Primary Examiner*—Sandra O'Shea
*Assistant Examiner*—Hargobind S. Sawhney
(74) *Attorney, Agent, or Firm*—Stephen W. Buckingham (57) ABSTRACT

An illuminated frontlit display includes a front light guide having at least one light input face that supplies light to the guide, a viewing face, and a light output face opposite the viewing face, the light output face having a light extraction layer thereon, the extraction layer having a substantially flat light exit face and containing buried reflective facets that extract supplied light from the guide through the light exit face to a reflective light valve and back through the viewing face of the guide to a viewer.

25 Claims, 6 Drawing Sheets

U.S. PATENT DOCUMENTS

| | | | |
|---|---|---|---|
| 5,594,830 A | 1/1997 | Winston et al. | 362/31 |
| 5,608,550 A | 3/1997 | Epstein et al. | 385/146 |
| 5,608,837 A | 3/1997 | Tai et al. | 349/57 |
| 5,613,751 A | 3/1997 | Parker et al. | 385/146 |
| 5,668,913 A | 9/1997 | Tai et al. | 362/31 |
| 5,671,994 A | 9/1997 | Tai et al. | 385/146 |
| 5,835,661 A | 11/1998 | Tai et al. | 385/146 |
| 5,894,539 A | 4/1999 | Epstein | 385/133 |
| 5,995,690 A | 11/1999 | Kotz et al. | 362/25 |
| 6,011,602 A | 1/2000 | Miyashita et al. | 349/65 |
| 6,064,784 A | 5/2000 | Whitehead et al. | 385/18 |
| 6,139,163 A | 10/2000 | Satoh et al. | 362/31 |
| 6,421,104 B1 * | 7/2002 | Richard | 349/63 |
| 2002/0075245 A1 | 6/2002 | Kawashima et al. | |

* cited by examiner

FRONTLIT DISPLAY

TECHNICAL FIELD

This invention relates to frontlit electronic displays.

BACKGROUND ART

Flat panel displays are typically backlit by light guide slabs (often referred to as "backlights") that provide uniform illumination to a transmissive light valve. The backlight may be the primary light source for the display, or a source of supplemental illumination in a predominantly reflective (often referred to as a "transflective") display. Alternatively, flat panel reflective displays may be front-lit by a light guide slab (often referred to as a "frontlight" or "front light guide") that provides uniform illumination from the viewing side of a reflective light valve. This allows elimination of the backlight and placement of a reflective layer in the light valve, thereby increasing the display's reflectivity and brightness in well-lit ambient light conditions when the frontlight is turned off. Front light guides should have sufficient clarity so that they do not distort or significantly attenuate the display image. Preferably the front light guide also uniformly illuminates the display at a brightness level sufficient to render the display readable in dark ambient conditions.

U.S. Pat. No. 5,396,350 shows a backlight having an array of microprisms that reflect light into a transmissive light valve.

U.S. Pat. No. 5,428,468 shows an illumination system employing a waveguide and an array of microprisms that reflect light out of the waveguide. U.S. Pat. No. 5,995,690 shows a light extraction tape for coupling light out of a waveguide.

Japanese Published Patent Application No. JP 11344695A (equivalent to WO 9963394) shows an integral front light guide and touch panel in which the light guide portion is made of molded plastic. The upper surface of the light guide is bonded to the lower surface of the touch panel using a layer of transparent resin, and the lower surface of the light guide has a polygonal or circular dot pattern formed by an ink of transparent or semi-transparent resin having a higher refractive index than the light transmission plate and containing a photodiffusion pigment. Alternatively, the lower surface of the light guide can be formed with "fine crimps" or with "prisms" (shown as sawtooth projections) formed parallel to the end face of the input of the light transmission plate. The light guide of this reference utilizes scattering by the above-mentioned photodiffusion pigment, or refraction through the above-mentioned crimps or prisms, to extract light from the light guide into a light valve. The sawtooth projections in this reference are oriented with the inclined portion of the sawtooth facing away from the light input end of the light guide.

Japanese Published Patent Application No. JP 2000-47178A shows an integral front light guide and touch panel in which the light guide portion is wedge-shaped and has a pattern of spacers on its upper surface. The light guide of this reference utilizes scattering by the spacers to extract light from the light guide into a light valve.

Other illuminated frontlit or backlit illumination or display devices are shown in U.S. Pat. Nos. 4,373,282; 4,528, 617; 4,751,615; 4,799,137; 4,811,507; 4,874,228; 5,005, 108; 5,050,946; 5,054,885; 5,190,370; 5,341,231; 5,359, 691; 5,485,354; 5,506,929; 5,555,109; 5,555,329; 5,575, 549; 5,594,830; 5,608,550; 5,608,837; 5,613,751; 5,668, 913; 5,671,994; 5,835,661; 5,894,539; 6,011,602 and 6,139, 163; in European Patent Application EP 0 802 446 A1; in Japanese Published Patent Application Nos. JP 61188515A, JP 11065764A, JP 11110131A, JP 11174972A, JP 11260133A, JP 11316553A, JP 11065764A and JP 2000075293A; and in PCT Published Patent Application No. WO 99/63394A.

SUMMARY OF THE INVENTION

Although a number of illuminated display devices have been proposed, there is an ongoing need for thinner, more efficient or more evenly illuminated devices, for devices that could be more easily constructed, and for devices with reduced power consumption. Many current devices do not use all of the light supplied by the light source. If such unused light could be channeled to the display, then power consumption could be further reduced and display brightness could be increased.

Some of the above-mentioned illuminated display devices employ scattering or refraction to extract light from the light guide. These approaches can cause reduction in contrast, or can supply light at less than optimal angles to a light valve in the display.

The present invention provides, in one aspect, an illuminated display comprising:

a) at least one light source;
  b) a front light guide having at least one light input face through which light from the source can be supplied to the guide, a viewing face, and a light output face opposite the viewing face, the light output face having a light extraction layer thereon, the extraction layer having a substantially flat light exit face and containing buried reflective facets that extract supplied light from the guide through the light exit face; and
  c) a reflective light valve that receives extracted light from the guide and returns at least some of that light through the viewing face.

The light guide can be easily fabricated from, for example, molded plastic or glass (e.g., ordinary plate glass) having two major faces. One of the major faces forms the viewing face, and is used as is or provided with an optional protective overlayer. The other major face forms the light output face, and is adhesively bonded or otherwise fastened to the structured side of a structured-surface, smooth surface sheet. The structured surface has facets on the structured side that will reflect supplied light from the light output face of the light guide through the smooth surface (the light exit face) of the sheet and into the reflective light valve. An optional antireflection coating can be applied to the light exit face of the smooth surface sheet. Because the light guide has microstructured reflective optics located between the light guide and the light valve and because the light guide can have a smooth viewing face, the illuminated displays of the invention are relatively robust and are less likely to be damaged than illuminated displays having microstructured optical features on the viewing face of a light guide. Preferred embodiments of the displays of the invention efficiently extract supplied light while exhibiting good contrast and low distortion.

DETAILED DESCRIPTION

When terms such as "above", "atop", "upper", "upward", "beneath", "below", "lower" and "downward" are used in this application to describe the location or orientation of components in a display, these terms are used merely for purposes of convenience and assuming that the viewing face of the display is horizontal and is viewed from above. These terms are not meant to imply any required orientation for the completed display or for the path taken by supplied or ambient light in actual use of the completed display. Some of the components of this invention and their relationship to one another can also conveniently be described by comparison to a reference plane. For purposes of this invention, the reference plane will be taken to be the plane formed by (or closely approximating) the light output face of the front light guide, which using the orientation convention described above would be the lower face of the light guide.

Figure 1:
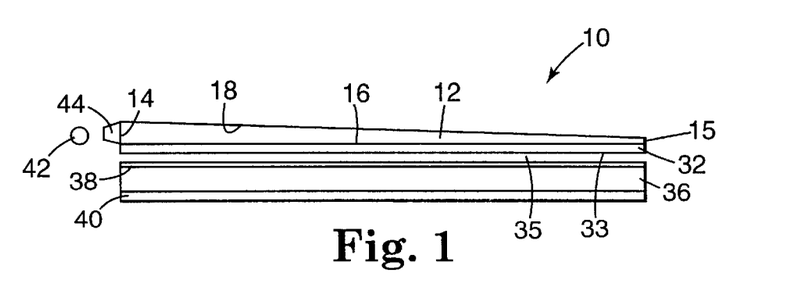
FIG. 1 is a side view of an illuminated display of the invention.

Referring now to FIG. 1, an illuminated display generally identified as 10 is shown in schematic form. Supplied (in other words, non-ambient) light from source 42 will enter coupler 44, where it typically is converted from a point source or sources to a line source suitable for use in display 10. The supplied light then enters light input face 14 of front light guide 12, and as explained in more detail below in FIG. 2 and FIG. 3 passes down into and then back up out of reflective light valve (in this case, a reflective LCD) 36. Light guide 12 is in the form of a wedge that decreases in thickness from light input face 14 towards end 15. As explained in more detail below, the light guide need not be made as a wedge, and for some applications will instead have a relatively constant thickness. In order to avoid possible chipping or fractures, light guide 12 does not taper down to a knife-edge at end 15. Light guide 12 also has light output face 16 and viewing face 18. An optically transparent adhesive (not shown in FIG. 1) fastens structured light extraction layer 32 to light output face 16 of light guide 12. An air gap 35 separates the lower face 33 of layer 32 from polarizer 38, which lies atop reflective LCD 36. Reflective layer 40 is located on the bottom of reflective LCD 36, and (assuming that reflective LCD 36 is suitably modulated to permit passage of light) serves to return light that passes from assembly 22 through reflective LCD 36 back towards assembly 22.

Figure 2:
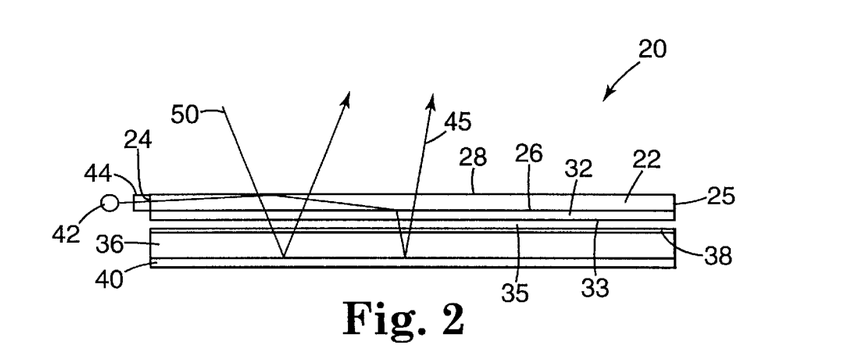
FIG. 2 is a simplified side view of the display of FIG. 1, showing the general path taken by ambient and supplied light rays.

FIG. 2 shows an illuminated display 20 of the invention. Unlike the generally tapered light guide 12 in FIG. 1, light guide 22 has a generally planar shape. Light rays such as supplied light ray 45 from source 42 are reflected towards the opposite end 25 of light guide 22 by total internal reflection off viewing face 28. Upon striking light output face 26 at a suitable angle, light ray 45 will pass into structured light extraction layer 32. If a facet (not shown in FIG. 2) of layer 32 is struck at a suitable angle by light ray 45, light ray 45 will be reflected from the facet, exit through the lower face 33 of layer 32 and thereby be extracted from light guide 22. The extracted light will pass through air gap 35, and then enter polarizer 38 and reflective LCD 36. Assuming that reflective LCD 36 is suitably modulated, light ray 45 will pass into reflective LCD 36, strike reflector 40, be reflected back through reflective LCD 36 and polarizer 38 into layer 32 and light guide 22, and exit light guide 22 through viewing face 28, whereupon light ray 45 can be seen by viewer 48.

If the ambient light level is sufficiently high, then information conveyed by illuminated display 20 can be seen by viewer 48 without the need for illumination by light source 42. Ambient light rays such as ambient ray 50 enter display 20 through viewing surface 28, pass through the various components and layers mentioned above, and (assuming that reflective LCD 36 is suitably modulated) strike reflector 40 and are reflected back through reflective LCD 36 towards viewer 48.

In illuminated display 10 in FIG. 1, supplied light from light source 42 is guided between two tapered faces 16 and 18 within light guide 12. In illuminated display 20 in FIG. 2, supplied light from light source 42 is guided between two generally parallel faces 26 and 28 within light guide 22. Either configuration can be employed and will offer certain advantages. A tapered light guide such as light guide 12 provides a greater fraction of the supplied light for display illumination. Owing to its tapered shape, it usually will be most convenient to fabricate such a light guide by molding an optically suitable thermoplastic polymer. A generally planar light guide such as light guide 22 will have reduced stray light exiting the "top" face, and may have less extraction efficiency, but can also provide an advantageous reduction in overall display thickness. A generally planar light guide can be fabricated by molding an optically suitable thermoplastic polymer, and can instead be made from a low cost, durable material such as plate glass.

Figure 3:
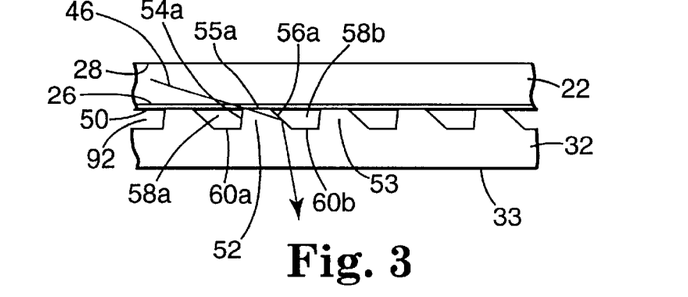
FIG. 3 is a magnified side view of a portion of the display of FIG. 1 and FIG. 2, showing the structured light extraction layer and the path taken by a supplied light ray.

Referring to FIG. 3, a light extraction layer suitable for use in displays of the invention is shown in a magnified side view. Light extraction layer 32 has a light exit face 33 and an upper surface having a plurality of projections such as projections 52 and 53 that face or point toward (and preferably optically contact) light guide 22. Face 33 is "substantially flat", that is, face 33 is sufficiently flat to avoid inducing objectionable distortion in the display. The upper surface of layer 32 is "structured", that is, it has a non-planar topography having finely-shaped features (such as projections 52 and 53) that can affect the direction or intensity of light rays that strike the upper surface of layer 32. Projections 52 and 53 are flanked by land portions such as lands 60a and 60b, and by enclosed pockets such as pockets 58a and 58b containing a medium (e.g., air) having a lower refractive index than the material from which layer 32 is manufactured. The projections have riser, plateau and facet portions such as riser 54*a*, plateau 55*a* and facet 56*a*. For purposes of discussion, projections such as projections 52 and 53 can be referred to as "generally trapezoidal", even though the projections have only three sides and even though a quadrilateral formed by drawing an imaginary line to complete the fourth side of a projection might not have two parallel sides.

The plateaus are laminated to light guide 22 using transparent adhesive 50. Plateau 55*a* lies against adhesive 50 and is generally coplanar with the other plateaus of layer 32. Facets such as facet 56*a* are "buried" in light extraction layer 32, that is, such facets lie within layer 32, between light output face 16 of light guide 22 and light exit face 33 of layer 32. Riser 54*a* adjoins plateau 55*a*, which in turn adjoins facet 56*a*. Preferably (disregarding for the moment any intervening layer of transparent adhesive), the facets are adjacent to or very near light output face 26 and spaced more remotely from light exit face 33.

Facets such as facet 56*a* are oriented so that light from the input face of light guide 22 such as supplied light ray 46 can pass through adhesive 50 and plateau 55*a*, strike facet 56*a*, be reflected downwards and thereby be extracted from light guide 22 through exit face 33. The supplied light is thus extracted from the light guide using reflective optics. Many front light guides that have heretofore been proposed employ an extraction mechanism that relies on refractive optics, for example by employing a prismatic (e.g., sawtooth, square wave or toothed) surface on the exit face of the light guide.

Supplied light can be extracted from the light guide at normal or near-normal angles with respect to the reference plane. In other words, the supplied light can be extracted at a zero or near-zero angle of incidence with respect to the reflective light valve. This can provide improved coupling of extracted light into the light valve compared to light guides that rely on refractive extraction. Using refractive extraction, it is difficult to achieve extraction angles whose centroid is greater than about 40° with respect to the reference plane. In other words, it is difficult to achieve less than about a 50° angle of incidence of the centroid of the extracted light with respect to a normal to the light valve. If the extracted light reaches the light valve at too high an angle of incidence, then the light valve will not efficiently reflect light toward the viewer, or additional optics (e.g., additional refractive optics) will be required to redirect the extracted light.

An extractor based on reflective optics is less sensitive to variations in wavelength of the supplied light than an extractor based on refractive optics. This can provide improved color uniformity in the illuminated displays of the invention compared to some illuminated displays that have heretofore been proposed. Stray reflections, which can lead to objectionable ghosts and loss of contrast, are also less pronounced with reflective extractors compared to refractive extractors. The stray reflections that do arise in reflective extractors tend to be directed away from the viewer. In refractive extractors, some stray reflections tend to be directed towards the viewer, leading to a loss in overall contrast. If such stray reflections are referred to as noise bands, then their presence along the viewing axis represents a source of noise and a loss in signal to noise ratio.

The use of reflective extraction optics in the illuminated displays of the invention thus can provide improved design flexibility and performance compared to the use of refractive optics.

Those skilled in the art will appreciate that although lands such as lands 60*a* and 60*b* are shown in FIG. 3 as being parallel to the reference plane, they need not be parallel. In addition, risers such as riser 54*a* need not be symmetrically inclined with respect to the reference plane. Likewise, facets such as facet 56*a* need not be symmetrically inclined with respect to the reference plane.

Those skilled in the art will also appreciate that the projections on light extraction layer 32 can have shapes and orientations other than those shown in FIG. 3, so long as proper extraction of light from light guide 22 into reflective LCD 36 takes place. The angle at which supplied light from source 42 enters light guide 22, and the dimensions, pitch and angular orientation of the projections on light extraction layer 32 preferably are selected so that supplied light is evenly distributed across the viewing face of the display.

Figure 4:
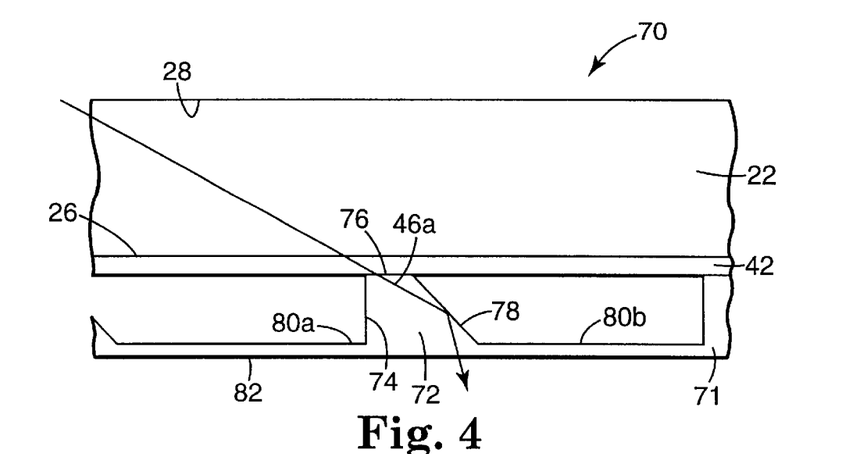
FIG. 4 is a magnified side view of a portion of an illuminated display of the invention having a low ratio of plateau length to land length.
Figure 5:
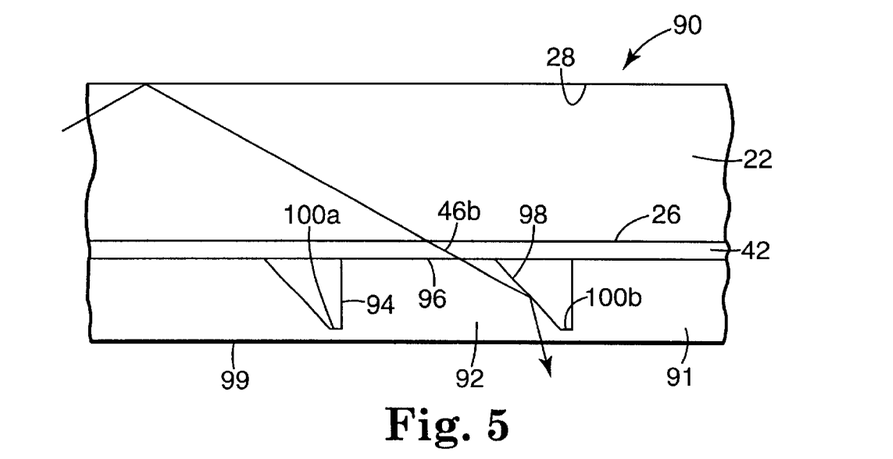
FIG. 5 is a magnified side view of a portion of an illuminated display of the invention having a high ratio of plateau length to land length.
Figure 6:
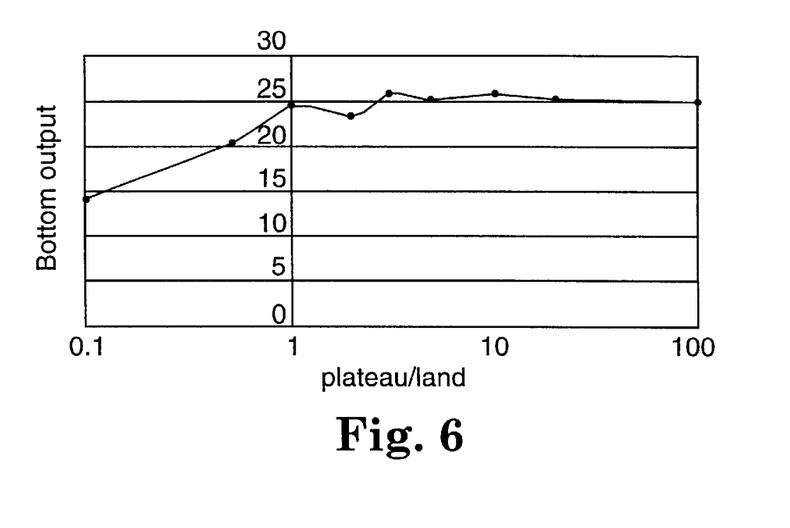
FIG. 6 is a graph showing the relationship between the ratio of plateau length to land length and extraction efficiency.

FIG. 4 through FIG. 6 illustrate the effect of the ratio of plateau length to land length upon overall light output from the bottom of the light guide. FIG. 4 shows a magnified side view of a portion of an illuminated display generally identified as 70. Structured light extraction layer 71 has projections such as projection 72 bounded by riser 74, plateau 76 and facet 78, and flanked by lands 80*a* and 80*b*. The total length of all plateaus in layer 71 is less than the total length of all lands in layer 71, or in other words the ratio of total plateau length to total land length is less than 1:1. Owing to the relatively small overall plateau area of layer 71, the available extraction window is relatively small and some of the potentially reflective portion of buried facets such as facet 78 may be inaccessible to supplied light rays such as ray 46*a*. Accordingly, a smaller fraction of such supplied light rays will be able to reach the facets in layer 71 at a suitable angle so that the supplied rays can be extracted from light guide 22 through exit face 82, and the overall light output from light guide 22 may be less than desired.

FIG. 5 shows a magnified side view of a portion of an illuminated display generally identified as 90. Structured light extraction layer 91 has projections such as projection 92 bounded by riser 94, plateau 96 and facet 98, and flanked by lands 100*a* and 100*b*. The total length of all plateaus in layer 91 is greater than the total length of all lands in layer 91, or in other words the ratio of total plateau length to total land length is greater than 1:1. Owing to the relatively large plateau area of layer 91, most or all of the facet area is available for reflection, and supplied light rays such as ray 46*b* will be able to reflect from facets in layer 91 and be extracted from light guide 22 through light exit face 99. Thus the overall light output from the bottom of light guide 22 in the illuminated display of FIG. 5 will tend to be greater than from the illuminated display of FIG. 4.

FIG. 6 is a graph showing the relationship between the ratio of plateau length to land length and light output from the exit face of the light guide. In general, light output (or extraction efficiency) increases as the ratio of plateau length to land length increases, in an approximately logarithmic relationship. Preferably the ratio of total plateau length to total land length is at least 1:1, more preferably at least 3:1. Once the full facet is exposed and accessible to the supplied light rays, the plateau length diminishes in importance and the curve shown in FIG. 6 levels off. In general, it is preferred for the land length to be greater than zero. For example, if the light extraction layer is formed from a flexible film, then preferably the lands should not be so short that it becomes difficult to peel away the film from the profiled tooling that typically would be used to make a structured flexible film.

Figure 7:
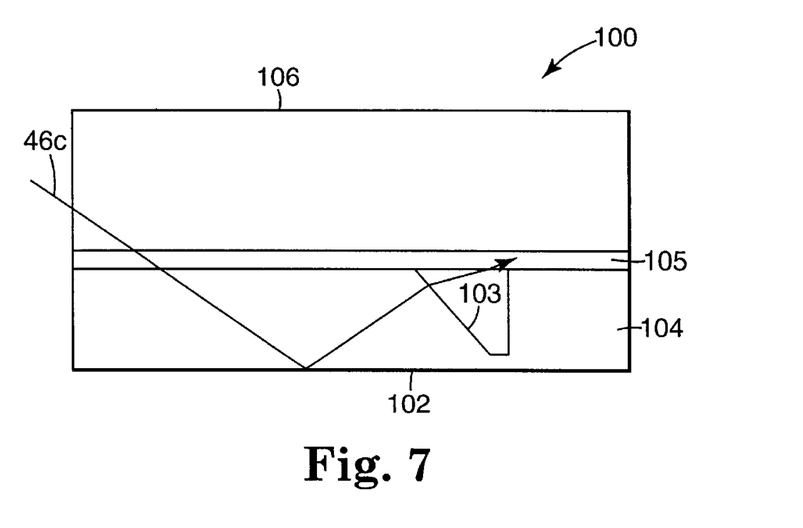
FIG. 7 is a magnified partial side view showing a source of light leakage.

FIG. 7 is a magnified partial side view of an illuminated display 100 of the invention, illustrating a potential source of light leakage. Some light rays such as ray 46c will be reflected upward via total internal reflection from the lower face 102 of structured light extraction layer 104 towards a buried facet such as facet 103. At sufficiently low angles of incidence to the facet, light will refracted through the facet, pass through adhesive layer 105 and light guide 108, and exit the upper face 106 of light guide 108 at a high angle of incidence, away from a typical user's view axis. This light will be lost and will not contribute to the viewer's perception of image brightness.

Figure 8:
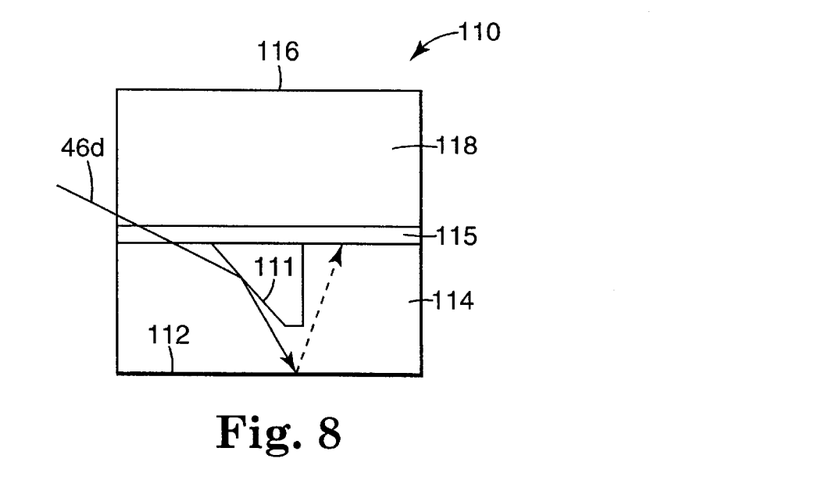
FIG. 8 is a magnified partial side view showing a source of ghosting.

FIG. 8 is a magnified partial side view of an illuminated display 110 of the invention, illustrating a potential source of ghosting. Some light rays such as ray 46d will be reflected downward from a facet such as buried facet 111, be reflected upward from the exit face 112 of structured light extraction layer 114, pass through adhesive layer 115 and light guide 118, and exit the upper face 116 of light guide 118. These light rays will exit light guide 118 at a lower angle of incidence than in the case of light ray 46c in FIG. 7, and can be visible as a ghost image of the illumination source.

Figure 9:
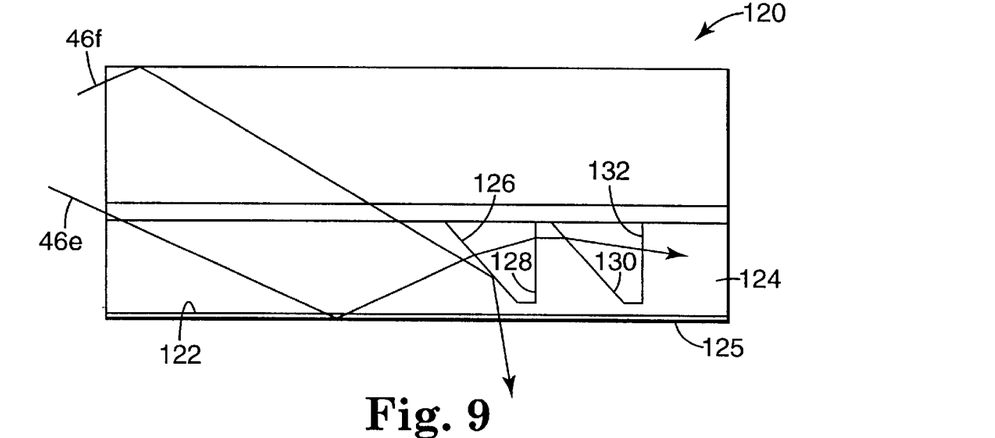
FIG. 9 is a magnified partial side view showing an extraction structure that can reduce light leakage and ghosting.

FIG. 9 is a magnified partial side view showing an illuminated display 120 of the invention having a structured light extraction layer 124 that can reduce light leakage such as is shown in FIG. 7, and an antireflection coating that can reduce ghosting of the type shown in FIG. 8. Light rays such as ray 46e that are reflected upward from the lower face 122 of layer 124 are refracted through buried facet 126 and riser 128, and then are recaptured by refraction through nearby buried facet 130 and riser 132 back into layer 124. Light rays such as ray 46f that are reflected from a facet such as buried facet 126 strike the lower face 122 of layer 124 and pass through face 122 due to the presence of antireflection coating 125 on face 122.

It is easier to apply a uniform antireflection coating to a flat surface than to a structured surface. Thus it is easier to employ such a coating on the lowermost face (in other words, the light exit face) of the light extraction layer used in the displays of the invention than on the lowermost face of front light guides that employ refractive optics to extract light through a structured surface on the lowermost face.

Those skilled in the art will appreciate that additional antireflection coating layers or other light management layers or features can be applied to exit face 33, so long as care is taken preserve the substantially flat topography of exit face 33 and to avoid introduction of undesirable distortions in the viewed image.

Those skilled in the art will also appreciate that more than one light source can be used to supply light to the displays of the invention. For example, referring again to FIG. 2, a plurality of light sources can be placed along light input face 24. Although not shown in FIG. 2, a plurality of light sources could also be placed along end 25. If light is supplied along both input face 24 and end 25, then the projections in the structured light extraction layer 32 (e.g., projections such as projections 52 and 53 shown in FIG. 3) preferably should be symmetrically oriented with respect to the supplied light from both input face 24 and end 25. If light is supplied only along input face 24, then end 25 is preferably equipped with a mirrored surface or other suitable reflector to direct light reaching end 25 back into light guide 22.

Figure 10:
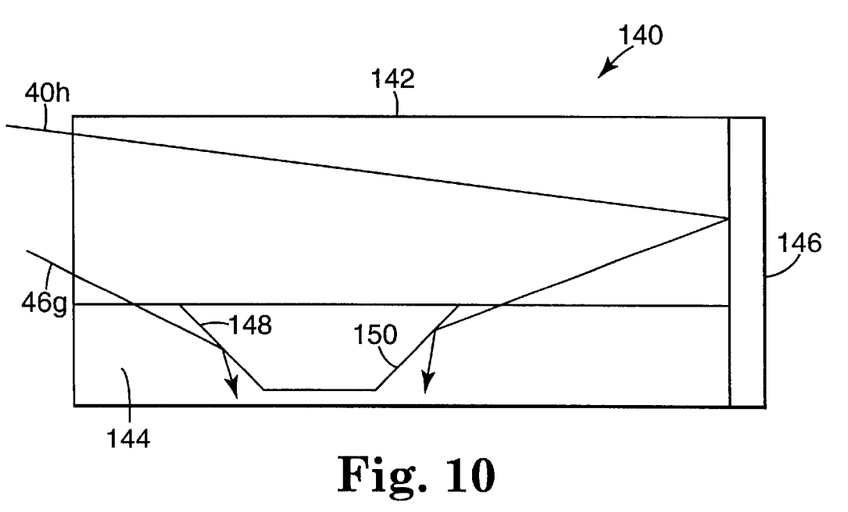
FIG. 10 is a magnified partial side view showing a light guide and an extraction structure that can reduce light leakage.

FIG. 10 is a magnified partial side view of an illuminated display 140 having a light guide 142 and a structured extraction layer 144 that can reduce light loss. Light guide 142 is equipped with a specular or diffuse reflector 146 that reflects light such as light ray 46h back into light guide 142. The amount of light reaching reflector 146 can be further reduced by tilting or biasing the light source (not shown in FIG. 10), so that the axis along which the majority of its light output falls is not parallel to the upper face of light guide 142. Light rays such as light ray 46g are reflected downwards from facets such as buried facet 148 and are extracted from layer 144. Light rays such as light ray 46h are reflected from reflector 146 back into layer 144 and reflected downward by reflection from facets such as buried facet 150, which is oppositely inclined from buried facet 148. These oppositely inclined facets can be repeated along the length of light guide 142.

Figure 11:
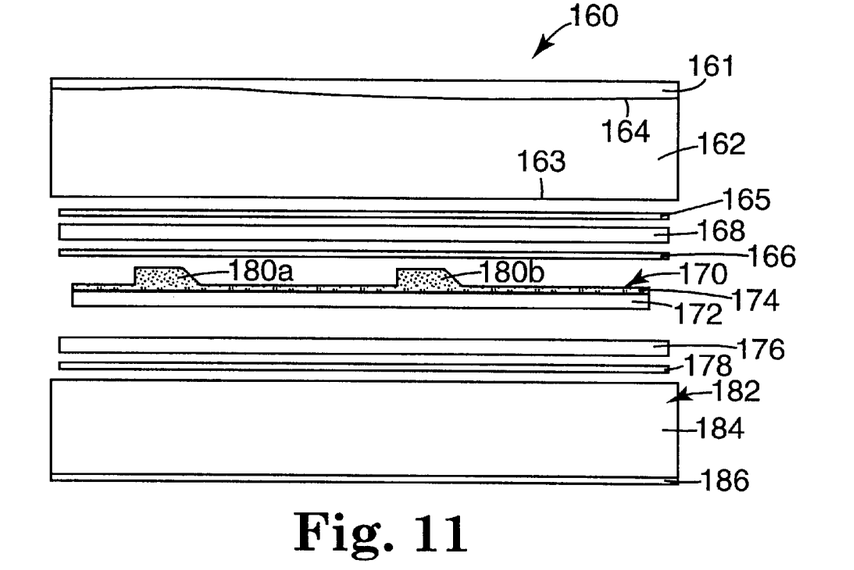
FIG. 11 is an exploded side view of a display of the invention.

FIG. 11 is an exploded side view of an illuminated display 160 of the invention, showing individual layers that can be assembled together. Optional protective membrane 161 is formed on the upper face 164 of light guide 162. Optically transparent adhesive layers 165 and 166 are coated on opposite sides of carrier film 168, and set aside. Structured light extraction layer 170 is formed from base film 172 and a light-curable resin using a suitable profiled tool, then cured to form light-cured structured surface 174 atop base film 172. If desired, an optional antireflection coating (not shown in FIG. 11) can be applied to the lower face of base film 172. This will be especially convenient when structured surface 174 is formed on base film 172 using a continuous method, as the antireflection coating can likewise be applied on the reverse side of base film 172 using a continuous method.

The plateau portions of structured light extraction layer 170 such as plateaus 180a and 180b are laminated to adhesive layer 166, taking care not to damage the structured surface 174 of layer 170 and not to fill the air spaces between projections in layer 170 with adhesive. Adhesive layer 165 can then be laminated to the light output face 163 of light guide 162. The resulting assembly can conveniently be sold as is, or combined with additional display components. For example, the assembly can be placed atop a suitable reflective light valve and equipped with a source of supplied light and suitable control electronics. As a further example, optically transparent adhesive layers 165 and 166 could be coated on opposite sides of carrier film 168, adhesive layer 166 could be laminated to the plateau portions of structured light extraction layer 170, and the resulting assembly sold as is for later lamination to the light output face of a light guide.

If desired, a more complete assembly can be made by laminating polarizer 176 to the upper face of reflective LCD 182 via adhesive layer 178. Reflective LCD 182 includes light modulation unit 184 and reflective layer 186. Other more complete or less complete assemblies can readily be envisioned by those skilled in the art.

Figure 12:
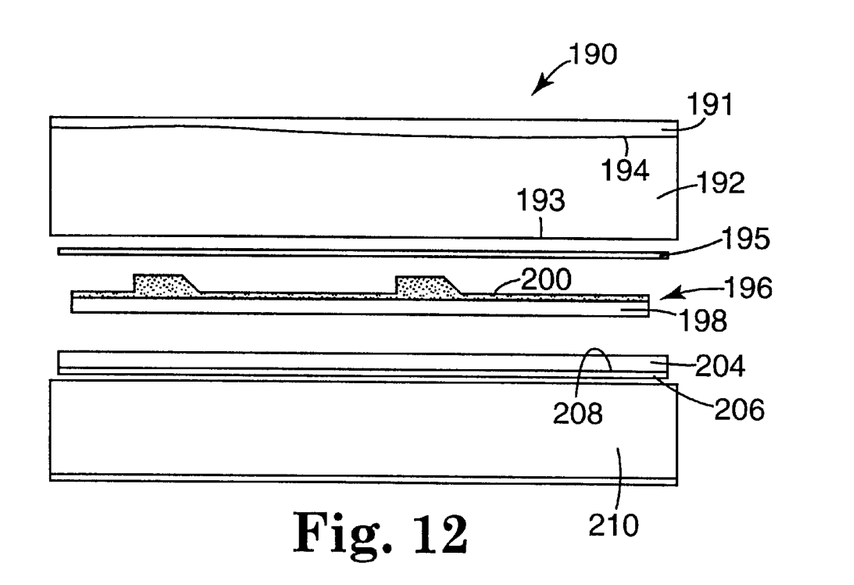
FIG. 12 is an exploded side view of another display of the invention.

FIG. 12 is an exploded side view of another illuminated display 190 of the invention, showing individual layers that can be assembled and fastened to the light output face 193 of light guide 192. Protective membrane 191 is formed on the upper face 194 of light guide 192. Optically transparent adhesive layer 195 is applied to the light output face 193 of light guide 192. Structured light extraction layer 196 is formed from base film 198 and a light-curable resin using a suitable profiled tool, then cured to form light-cured structured surface 200 atop base film 198. Structured layer 196 is laminated to adhesive layer 202 and polarizer 204, taking care not to damage the structured surface 200 of layer 196 and not to fill the air spaces between projections in layer 196 with adhesive. If desired, an optional antireflection coating (not shown in FIG. 12) can be applied to the lower face of base film 198. The assembly of FIG. 12 has fewer layers and fewer optical interfaces in the light path than the assembly of FIG. 11, but requires somewhat greater care in handling and during lamination.

The light guide can have any desired overall size and thickness but preferably it is as thin as possible, e.g., 5 mm or less. The light guide can be square, rectangular, oval or any other desired shape when viewed from the intended display observation point. The size and shape of the light guide usually will be dictated by the size and shape of the desired display device. Light guide thicknesses from about 0.1 to about 5 mm are preferred, more preferably about 1 to about 2 mm.

The light guide can be fabricated from a wide variety of optically suitable materials including glass; polycarbonate; polyacrylates such as polymethyl methacrylate; and polystyrene, with glass and high refractive index plastics such as polycarbonate being preferred. The light input face and viewing face of the light guide can each be generally planar or can have a convex or concave curvature. When the light source is a point or line source, the light input face may be provided with a convex curvature, lenslets, prisms, a roughened surface or other features in order to distribute the incoming light more evenly. The viewing face preferably has an optically smooth finish, in order to minimize transmission losses, undesired scattering and distortion.

The light extraction layer can be fabricated from a wide variety of optically suitable materials including polycarbonate; polyacrylates such as polymethyl methacrylate; and polystyrene, with high refractive index plastics such as polycarbonate being preferred. The light extraction layer preferably is a flexible structured film made by molding, embossing, curing or otherwise forming a moldable resin against a lathe-turned tool or other formed surface, made of metal or other durable material that bears a negative replica of the desired structured surface. Methods for making such formed surfaces and for molding, embossing or curing the extraction film will be familiar to those skilled in the art.

Individual light extraction layer designs can if desired be evaluated without the need for actual layer fabrication, by using suitable ray-tracing modeling software such as "ASAP" from Breault Research Organization, Inc., "Code V" and "Light Tools" from Optical Research Associates, "Optica" from Wolfram Research, Inc. and "ZEMAX" from Focus Software, Inc.

The facets that are present in the light extraction layer (and are buried in the assembled light guide and extraction layer) preferably are sufficiently small so as to be unobtrusive to an ordinary viewer. The configuration, shape and dimensions of the facets and other light management features of the light extraction layer preferably are chosen to maximize extraction efficiency and provide evenly distributed light output at the desired viewing angle.

The projections preferably extend across the full width of the light extraction layer. Although less preferred, the projections can be in the form of shorter, less than full width segments, which can be aligned with one another in rows and columns or staggered from row to row. Rows of projections can be arranged parallel to the light input face or faces, or at an angle with respect to the light input face or faces. Most preferably, the projections extend across the full width of the light extraction layer and are generally parallel to the light input face or faces.

In the various embodiments of the invention shown in the Drawing, individual projections in the structured light extraction layers are shown as having the same angular orientation, shape and dimensions from projection to projection. The projections need not all be identical and need not all have the same angular orientation, shape or dimensions. For ease of manufacturing, generally it will be preferred to form a light extraction layer having projections whose riser, plateau and facet segments have the same angular orientation and segment length from projection to projection. The land segments between such projections can if desired also be similar to one another in angular orientation and segment lengths. Preferably however the projections are spaced at a relatively coarser pitch (repeat interval) near the light input face or faces of the light guide, and at a relatively finer pitch further from the light input face or faces. For a light guide illuminated from only one end, this change in spacing can conveniently be accomplished by progressively decreasing the length of the land segments along the length of the light extraction layer from the light input face to the face at the other end of the light guide. A preferred pitch is from about 0.06 to about 12 projections per mm at the light input face or faces to a maximum of about 250 to about 1 projection per mm further from the light input face or faces.

Those skilled in the art will appreciate that formation of Moiré or other interference patterns can be discouraged or prevented in a variety of ways. For example, the dimensions, angular orientation or spacing of the rows of projections can be adjusted relative to the dimensions, angular orientation or spacing of pixels or other repeating elements in the reflective light valve (e.g., by skewing the direction of the rows of projections a few degrees with respect to the direction of the rows of pixels), so that interference patterns are minimized or eliminated at the viewing face of the display.

Each light extraction layer riser segment preferably is planar although other shapes such as convex or concave shapes can be used if desired. Preferably the facets and other structured surface portions of the light extraction layer are optically smooth, in order to avoid undesirable visual artifacts that may arise due to backscattering of light within the light guide.

The light extraction layer preferably has a thickness of about 20 micrometers to about 500 micrometers, more preferably about 75 to about 125 micrometers. Facet heights (or in other words, land depths) of about 5 to about 50 micrometers are preferred, more preferably about 7 to about 20 micrometers. So long as the facets have sufficient height, the chosen extraction layer thickness has a relatively small effect on extraction efficiency.

Extraction efficiency tends to increase as facet heights increase, as the light guide thickness is reduced, or as the projection pitch decreases. That is, extraction efficiency tends to scale proportionally to (facet height)/[(light guide thickness)*(pitch)]. Put slightly differently, extraction efficiency tends to scale proportionally to the total cross-sectional area of the facets divided by the total cross-sectional area of the light guide input face.

The adhesive layers used to assemble the various layers in the displays of the invention can be pressure sensitive adhesives, adhesives cured using energy sources such as heat, UV or electron beam, or any other adhesive having acceptable optical and mechanical properties. Suitable adhesives and joining techniques will be familiar to those skilled in the art. If desired, one or more of the adhesive layers can be cured after assembly, e.g., by applying the adhesive to one or both of the surfaces to be joined together, mating such surfaces together to form a laminated assembly, and exposing the adhesive layer or layers to suitable curing energy (e.g., UV or e-beam) through one or both sides of the laminated assembly to effect cure.

The adhesive layer between the light guide and the light extraction layer should be applied with care. Such an adhesive can, for example, be applied to the entire light output face of the light guide and the light extraction layer laminated thereto. If desired, the adhesive can be coated atop only the plateau portions of the light extraction layer, and the resulting partially-coated surface laminated to the light output face of the light guide, e.g., as described in U.S. Pat. No. 5,545,280. In either case, appropriate care should be taken not to damage the structured surface of the light extraction layer and not to fill the pockets between projections with adhesive.

If desired, the pockets between projections can be filled prior to lamination with a suitable flowable (and preferably hardenable) material having a lower refractive index than the material from which the light extraction layer is made. This can simplify lamination of the light extraction layer to the light guide, and help discourage the adhesive from filling the pockets. However, if the flowable material has a refractive index between that of air and the material from which the light extraction layer is made, then the use of such a flowable material may adversely affect the reflective characteristics of the facets and may reduce overall extraction efficiency compared to the use of air-filled pockets.

The illuminated displays of the invention are particularly useful in subminiature or miniature devices illuminated with light emitting diodes (LEDs) powered by small batteries. Suitable devices include cell phones, pagers, personal digital assistants, clocks, watches, calculators, still and video cameras, laptop computers, vehicular displays and the like. The reflective light valves in such devices can be made using a variety of color or monochrome devices. For example, the reflective light valve can be a reflective color LCD such is used in the COMPAQ iPAQ™ Pocket PC. The reflective light valve can also be a device capable of controlled frustration of total internal reflection such as the devices described in U.S. Pat. No. 6,064,784 and PCT Published Application No. WO 00/75720; a fixed graphic device such as a poster or sign (e.g., a printed menu); or a variable-appearance substrate such as "Gyricon" electronic display material (under development by Gyricon Media Inc.). The illuminated displays of the invention can be illuminated with more than one light source, e.g., three or more LEDs. An array of colored light sources (e.g., one or more of each of a red, green and blue LED) can be employed, with the light sources in the array being electronically energized using a continuous or strobed addressing scheme. In addition to LEDs, other suitable illumination sources for the displays of the invention include fluorescent or incandescent lamps, electroluminescent lights and the like. A particularly preferred light source for the illuminated displays of the invention employs the LINEAR ILLUMINATION SOURCE described in copending application Serial No. (attorney's docket no. 56209USA6A.002) filed on even date herewith, the disclosure of which is incorporated herein by reference.

Various modifications and alterations of this invention will be apparent to those skilled in the art without departing from the scope and spirit of this invention. It should be understood that this invention is not limited to the illustrative embodiments set forth above.

We claim:

1. An illuminated display comprising:

a) at least one light source;

b) a front light guide having at least one light input face through which light from the source can be supplied to the light guide, a viewing face, and a light output face opposite the viewing face, the light output face having a light extraction thereon, the extraction layer having a substantially flat light exit face and containing buried reflective facets that extract supplied light from the light guide through the light exit face; and c) a reflective light valve that receives extracted light from the light guide and returns at least some of that light through the viewing face wherein the facets have varied dimensions, pitch or angular orientation such that the supplied light is evenly distributed across the viewing face.

2. A display according to claim 1, wherein the light guide comprises a planar glass or plastic sheet and the extraction layer comprises a structured surface that faces the light guide and a smooth face that faces away from the light guide.

3. A display according to claim 1, wherein the extraction layer comprises a flexible film having a structured surface comprising a plurality of projections fastened to the light guide via a transparent adhesive, and wherein pockets adjacent the facets and between the projections contain a medium having a lower refractive index than the material from which the film is made.

4. A display accordign to claim 3, wherein the projections have a generally trapezoidal shape.

5. A display according to claim 3, wherein the projections comprise the facets and further comprise risers and plateaus, and wherein supplied light passes from the light output face through a plateau and then is reflected from a facet through the light exit face.

6. A display according to claim 3, wherein lands separate the projections and wherein the pockets contain air.

7. A display according to claim 3, wherein the light extraction layer has a width and the facets extend across that width.

8. A display according to claim 3, wherein the centroid of the supplied light extracted from the light guide has less than about a 50° angle of incidence with respect to a normal to the light valve.

9. A display according to claim 1, wherein substantially all the facet area is accessible to the supplied light.

10. A display according to claim 1 selected from the group consisting of a cellular telephone, pager, personal digital assistant, clock, watch, calculator, laptop computer or transportation vehicle.

11. A display according to claim 1, wherein the light extraction layer has a width and the facets extend across that width.

12. A display according to claim 1, wherein the centroid of the supplied light extracted from the light guide has less than about a 50° angle of incidence with respect to a normal to the light valve.

13. An illuminated display comprising:

a) at least one light source;

b) a front light guide having at least one light input face through which light from the source can be supplied to the light guide, a reflective face opposite the light input face that reflects supplied light back into the light guide, a viewing face, and a light output face opposite the viewing face, the light output face having a light extraction layer thereon, the extraction layer having a substantially flat light exit face and containing buried reflective facets that extract supplied light from the light guide through the light exit face, and wherein some of the facets are inclined so that supplied light reflected from the reflective face is extracted from the light guide via such inclined facets; and c) a reflective light valve that receives extracted light from the light guide and returns at least some of that light through the viewing face wherein the facets have varied dimensions, pitch or angular orientation such that the supplied light is evenly distributed across the viewing face.

14. An illuminated display comprising:
   a) at least one light source;
   b) a front light guide having at least one light input face through which light from the source can be supplied to the light guide, a viewing face, and a light output face opposite the viewing face, the light output face having a light extraction layer thereon, the extraction layer having a substantially flat light exit face and containing buried reflective facets that extract supplied light from the light guide through the light exit face; and
   c) a reflective light valve that receives extracted light from the light guide and returns at least some of that light through the viewing face
wherein the light guide comprises a tapered plastic sheet and the extraction layer comprises a structured surface that faces the light guide and a smooth surface that faces away from the light guide.

15. A display according to claim 14, wherein the light extraction layer has a width and the facets extend across that width.

16. A display according to claim 15, wherein the centroid of the supplied light extracted from the light guide has a zero or near-zero angle of incidence with respect to the normal.

17. A display according to claim 14, wherein the centroid of the supplied light extracted from the light guide has less than about a 50° angle of incidence with respect to a normal to the light valve.

18. An illuminated display comprising:
   a) at least one light source;
   b) a front light guide having at least one light input face through which light from the source can be supplied to the light guide, a viewing face, and a light output face opposite the viewing face, the light output face having a light extraction layer thereon comprising a film having a structured surface comprising a plurality of projections that face the light guide, the extraction layer having a substantially flat light exit face and containing buried reflective facets that extract supplied light from the light guide through the light exit face and containing pockets adjacent the facets and between the projections containing air, wherein lands separate the projections, the projections further comprise plateaus, and the ratio of total plateau length to total land length is greater than 1:1; and
   c) a reflective light valve that receives extracted light from the light guide and returns at least some of that light through the viewing face.

19. A display according to claim 18, wherein the ratio is greater than 3:1.

20. An illuminated display comprising:
   a) at least one light source;
   b) a front light guide having at least one light input face through which light from the source can be supplied to the light guide, a viewing face, and a light output face opposite the viewing face, the light output face having a light extraction layer thereon comprising a film having a structured surface comprising a plurality of projections that face the light guide, the extraction layer having a substantially flat light exit face and containing buried reflective facets that extract supplied light from the light guide through the light exit face, and wherein pockets adjacent the facets and between the projections contain a medium having a lower refractive index than the material from which the film is made; and
   c) a reflective light valve that receives extracted light from the light guide and returns at least some of that light through the viewing face;
wherein the projections are spaced at a relatively coarser pitch of from about 0.06 to about 12 projections per mm near the light input face or faces to a relatively finer pitch of about 250 to about 1 projection per mm further from the light input face or faces such that supplied light is evenly distributed across the viewing face.

21. An illuminated display comprising:
   a) at least one light source;
   b) a front light guide having at least one light input face through which light from the source can be supplied to the light guide, a viewing face, and a light output face opposite the viewing face, the light output face having a light extraction layer thereon comprising a film having a structured surface comprising a plurality of projections that face the light guide, the extraction layer having a substantially flat light exit face and containing buried reflective facets that extract supplied light from the light guide through the light exit face, and wherein pockets adjacent the facets and between the projections contain a medium having a lower refractive index than the material from which the film is made; and
   c) a reflective light valve that receives extracted light from the light guide and returns at least some of that light through the viewing face;
wherein supplied light that is reflected from the exit face and refracted through a facet is recaptured by being refracted through a nearby facet and directed into the light extraction layer.

22. An illuminated display comprising:
   a) at least one light source;
   b) a front light guide having at least one light input face through which light from the source can be supplied to the light guide, a viewing face, and a light output face opposite the viewing face, the light output face having a light extraction layer thereon comprising a film having a structured surface comprising a plurality of projections that face the light guide and that are spaced at a relatively coarser pitch near the light input face and at a relatively finer pitch further from the light input face, the extraction layer having a substantially flat light exit face, containing pockets adjacent the facets and between the projections containing a medium having a lower refractive index than the material from which the film is made and containing buried reflective facets that extract supplied light from the light guide through the light exit face; and
   c) a reflective light valve that receives extracted light from the light guide and returns at least some of that light through the viewing face.

23. An illuminated display comprising:
   a) at least one light source;
   b) a front light guide having at least one light input face through which light from the source can be supplied to the light guide, a viewing face, and a light output face opposite the viewing face, the light output face having a light extraction layer thereon comprising a film having a structured surface comprising a plurality of projections that face the light guide, an extraction layer having a substantially flat light exit face and containing buried reflective facets that extract supplied light from the light guide through the light exit face, wherein pockets adjacent the facets and between the projections contain a medium having a lower refractive index than the material from which the film is made; and c) a reflective light valve that receives extracted light from the light guide and returns at least some of that light through the viewing face;

wherein the reflective light valve has pixels or other repeating elements having dimensions, pitch or angular orientation, and the projections have dimensions, pitch or angular orientation that are varied relative to the dimensions, pitch or angular orientation of the pixels or other repeating elements such that Moiré patterns are not visible on the viewing face.

24. An illuminated display comprising:

a) at least one light source;

b) a front light guide having at least one light input face through which light from the source can be supplied to the light guide, a viewing face, and a light output face opposite the viewing face, the light output face having a light extraction layer thereon, the extraction layer having a substantially flat light exit face with an antireflection coating on the light exit face, and containing buried reflective facets that extract supplied light from the light guide through the light exit face; and c) a reflective light valve that receives extracted light from the light guide and returns at least some of that light through the viewing face.

25. A display according to claim 24, further comprising an air gap between such coating and the light valve.

* * * * *